(12) United States Patent
VanFleteren et al.

(10) Patent No.: US 12,003,020 B2
(45) Date of Patent: Jun. 4, 2024

(54) RADAR COMPATIBLE BADGE FOR VEHICLE

(71) Applicant: FORD GLOBAL TECHNOLOGIES, LLC, Dearborn, MI (US)

(72) Inventors: Linda D. VanFleteren, Troy, MI (US); James P. Ebling, Ann Arbor, MI (US); Scott H. Gaboury, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 1353 days.

(21) Appl. No.: 16/357,510

(22) Filed: Mar. 19, 2019

(65) Prior Publication Data

US 2020/0303812 A1    Sep. 24, 2020

(51) Int. Cl.
| | |
|---|---|
| B29C 45/14 | (2006.01) |
| B60R 13/00 | (2006.01) |
| H01Q 1/32 | (2006.01) |
| H01Q 1/42 | (2006.01) |
| H01Q 1/44 | (2006.01) |
| B29K 9/06 | (2006.01) |
| B29K 33/00 | (2006.01) |
| B29K 55/02 | (2006.01) |
| B29K 705/00 | (2006.01) |

(52) U.S. Cl.
CPC ......... *H01Q 1/3233* (2013.01); *B60R 13/005* (2013.01); *H01Q 1/422* (2013.01); *H01Q 1/44* (2013.01); *B29C 45/14* (2013.01); *B29K 2009/06* (2013.01); *B29K 2033/12* (2013.01); *B29K 2055/02* (2013.01); *B29K 2705/00* (2013.01)

(58) Field of Classification Search
CPC ... H01Q 1/3233; B29C 45/14; B29K 2033/12
See application file for complete search history.

(56) References Cited

U.S. PATENT DOCUMENTS

| | | | |
|---|---|---|---|
| 8,266,833 | B2 | 9/2012 | Pierce et al. |
| 8,702,135 | B2 | 4/2014 | Gaboury et al. |
| 9,834,155 | B2 | 12/2017 | Gong |
| 2017/0324157 | A1 | 11/2017 | Shurish et al. |
| 2019/0036205 | A1* | 1/2019 | Suzuki ................. H01Q 1/3233 |

FOREIGN PATENT DOCUMENTS

| | | | |
|---|---|---|---|
| JP | 2018066706 | A * | 4/2018 |
| WO | 2017211419 | A1 | 12/2017 |
| WO | 2018121855 | A1 | 7/2018 |

OTHER PUBLICATIONS

Custom Antenna Radome Enclosure, http://www.ets-lindgren.com/products/antennas/custom-antenna-radome-enclosure/4007/400701.

* cited by examiner

*Primary Examiner* — Farah Taufiq
(74) *Attorney, Agent, or Firm* — Vichit Chea; MacMillan, Sobanski & Todd, LLC

(57) ABSTRACT

A method of forming a badge may include thermally forming an indium film into a desired shape for the badge, including thermally forming a raised symbol above a front surface on the front side of the indium film; molding a plastic back layer to a back side of the thermally formed indium film; and molding a plastic front layer to a front side, opposite to the back side, of the thermally formed indium film. The badge may be mounted on a front of a vehicle.

16 Claims, 2 Drawing Sheets

RADAR COMPATIBLE BADGE FOR VEHICLE

BACKGROUND OF THE INVENTION

The present invention relates to a badge employed to identify a manufacturer, make or model of vehicle, and more particularly to such a badge that is compatible with vehicle radar.

Automotive vehicles commonly include one or more badges on the exteriors of the vehicles that identify the manufacturer, make or model of the vehicle. Commonly a badge is included on the front of the vehicle, for example, on the grille, the hood or a hood ornament.

In addition, as automotive vehicles add more autonomous types of functions, some may employ radar for detecting objects around the vehicle. Such a radar system may be forward looking toward objects in front of the vehicle. Such vehicles, then, may create concerns with the locations of badges relative to the radar emitter/receiver—both for functionality as well as providing esthetically pleasing front styling for the vehicle (and badge).

SUMMARY OF THE INVENTION

An embodiment contemplates a method of forming a badge comprising: thermally forming an indium film into a desired shape for the badge; molding a plastic back layer to a back side of the thermally formed indium film; and molding a plastic front layer to a front side, opposite to the back side, of the thermally formed indium film.

An embodiment contemplates a method of forming a badge comprising: thermally forming an indium film into a desired shape for the badge, including thermally forming a raised symbol above a front surface on the front side of the indium film; molding a plastic back layer to a back side of the thermally formed indium film; molding a plastic front layer to a front side, opposite to the back side, of the thermally formed indium film; and mounting the badge on a front of a vehicle.

An advantage of an embodiment is that a radar compatible badge for a vehicle allows for flexibility in vehicle styling with regard to locating of the badge, as well as flexibility in where a radar emitter/receiver is located in order to allow for greater flexibility in packaging design for desired air flow and packaging of underhood components, such as front end modules.

DETAILED DESCRIPTION

FIGS. 1-4 illustrate various views of portions of a radar compatible badge 20 that is configured for mounting on a vehicle 44, which may have a radar system that emits/receives a signal through the badge 20.

Figure 1:
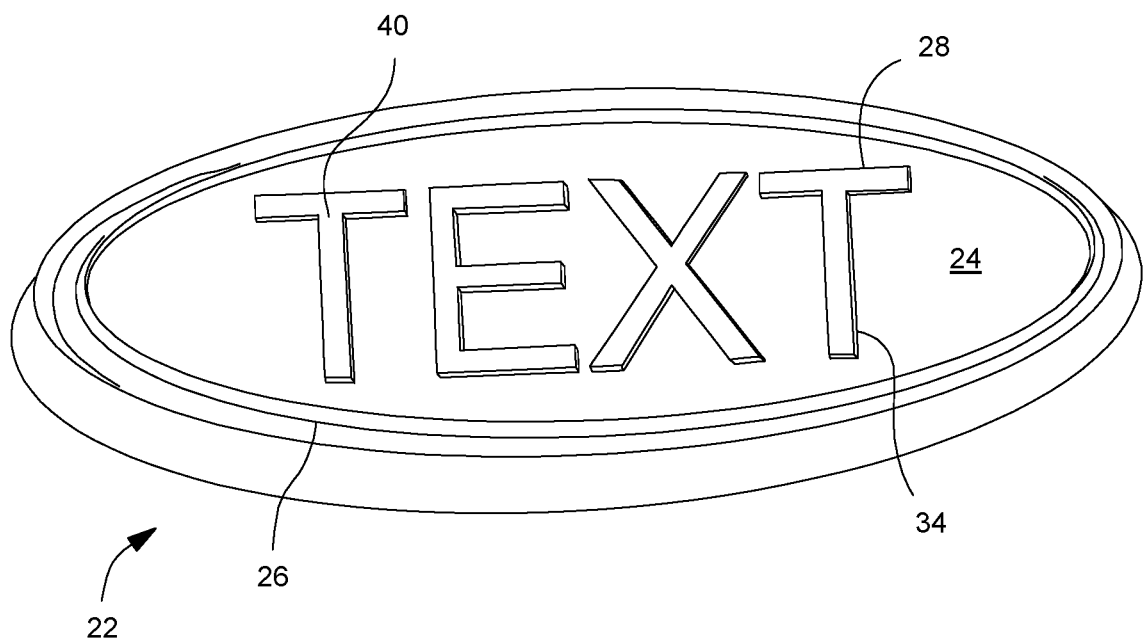
FIG. 1 is a schematic perspective view of a front side of a layer of thermal form indium film shaped to create the desired badge design.

FIG. 1 illustrates a portion of the badge 20—a thermally formed indium film 22. This indium film may be vacuum formed. The indium film 22 is metallic and offers a bright chrome-looking appearance, but still allows radar to "see" (i.e., readily pass through) the film 22. The indium film 22 may be shaped to have contours and depth that form the desired shape of the logo, such as for example a curved front surface 24 with a raised oval ridge 26 surrounding the front surface 24. Additionally, the indium film 22 may include text 28 that may be raised from the front surface 24. Such text 28 may be for example the particular name of the manufacturer or model of vehicle.

Figure 2:
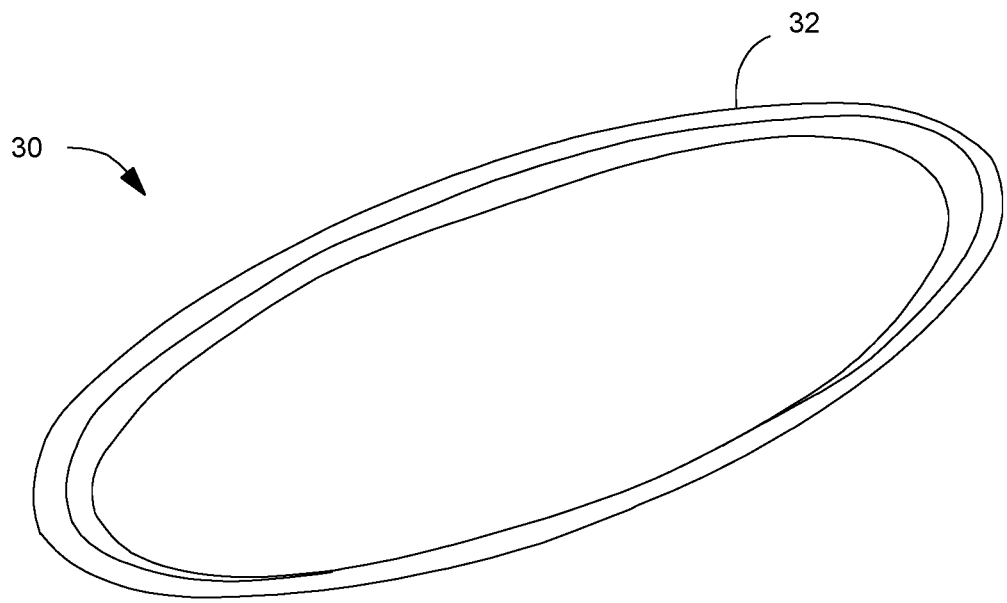
FIG. 2 is a schematic perspective view of a molded plastic layer on a back side of the indium film.

FIG. 2, in view of FIG. 1, illustrates a two layer portion 30 of the badge 20—with a back layer 32 molded (such as injection molding) to the back of the indium film 22 (as seen in FIG. 1). The back layer 32 may be made from, for example, acrylonitrile butadiene styrene (ABS) or polymethylmethacrylate (PMMA) or other types of plastic materials compatible with the indium film 22, if so desired.

Figure 3:
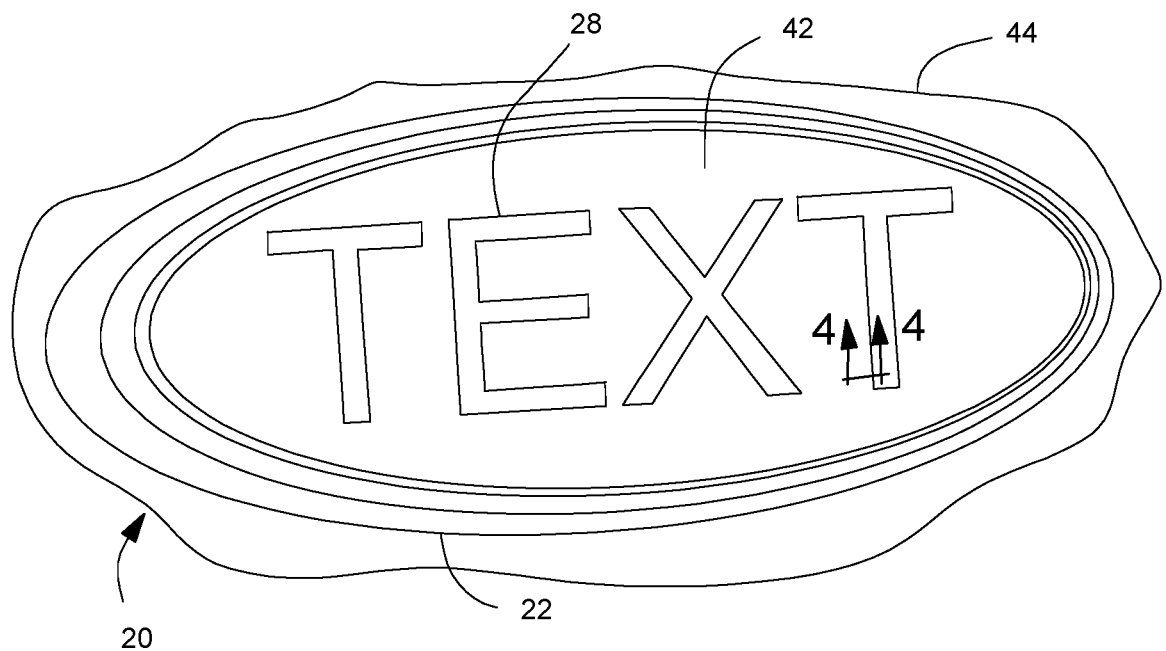
FIG. 3 is a schematic perspective view of the front side of a completed badge with a front plastic layer over portions of the indium film.
Figure 4:
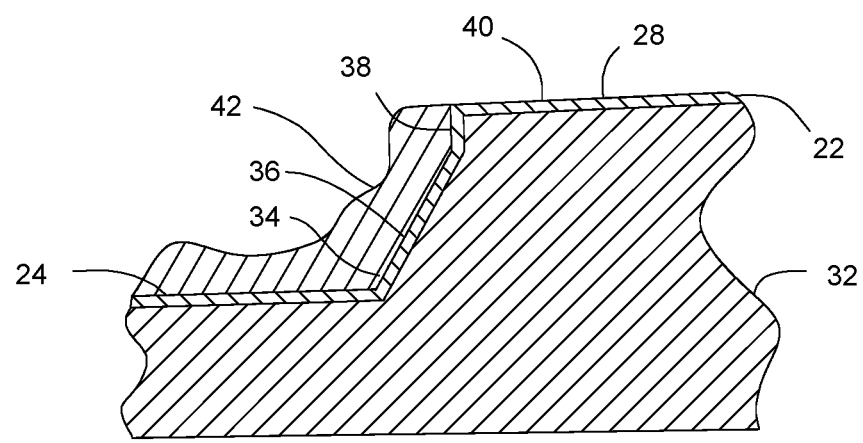
FIG. 4 is a schematic section view through a portion of the completed badge of FIG. 3.

FIGS. 3 and 4, in view of FIGS. 1 and 2, illustrate a completed badge 20, with a front layer 42 molded, such as by injection molding, over the front of the indium film 22. Since this front layer 42 is visible when the badge 20 is mounted on a vehicle, this layer may be colored to provide the desired esthetics for the overall badge design. This front layer 42 may be made from, for example, PMMA with the desired color added, acrylic-styrene-acrylonitrile (ASA) or other types of plastic materials compatible with the indium film 22 and stable in ultraviolet light, it so desired. The front layer 42 may be molded around the raised text 28 so that the metallic chrome type of appearance of the indium film 22 is readily visible in the completed badge 20, while the coloration of the front layer 42 surrounds the text 28.

To reduce radar antenna beam distortion, the text 28 extending above the front surface 24 may have sides 34 that are shaped other than extending straight up from the surface 24 (see in particular FIG. 4). For example, a first section 36 may extend upward from and be angled at about twenty degrees from perpendicular from the front surface 24, and a second section 38 may extend from the first section 36 to a top surface 40 of the text 28 essentially perpendicular to the front surface 24. The second section 38, for an automotive badge, may be for example about 0.70 to 0.80 millimeters high—but other dimensions of the section 38 may be employed instead, if so desired. The first section 36 may be longer (length in the direction out from the front surface) than the second section 38, for example about 3 to 4 times as long—but other dimensional ratios may be employed instead if so desired.

The completed badge 20, then, provides for the desired design and location of the badge 20 for mounting on a vehicle 44 while reducing interference from any radar system mounted behind the badge 20.

While certain embodiments of the present invention have been described in detail, those familiar with the art to which this invention relates will recognize various alternative designs and embodiments for practicing the invention as defined by the following claims.

The invention claimed is:
1. A method of forming a badge comprising:
thermally forming an indium film into a desired shape for the badge;
molding a plastic back layer to a back side of the thermally formed indium film; and
molding a plastic front layer to a front side, opposite to the back side, of the thermally formed indium film.

2. The method of claim 1 wherein thermally forming the indium film includes thermally forming a raised symbol above a front surface on the front side of the indium film.

3. The method of claim 2 wherein the raised symbol includes a side wherein a first section of the side is thermally formed to extend outward from the front surface at a non-perpendicular angle to the front surface and a second section of the side is thermally formed to extend outward from the first section to a top surface of the symbol essentially at a perpendicular angle to the front surface.

4. The method of claim 3 wherein the non-perpendicular angle is about twenty degrees from perpendicular to the front surface.

5. The method of claim 3 wherein the first section of the side is three to four times longer than the second section, in the direction perpendicular to the front surface.

6. The method of claim 3 further including mounting the badge on a front of a vehicle.

7. The method of claim 1 wherein the back layer is injection molded to the indium film.

8. The method of claim 7 wherein the back layer is formed of acrylonitrile butadiene styrene.

9. The method of claim 7 wherein the back layer is formed of polymethylmethacrylate.

10. The method of claim 1 wherein the front layer is injection molded to the indium film.

11. The method of claim 10 wherein the front layer is formed of polymethylmethacrylate.

12. The method of claim 1 further including mounting the badge on a front of a vehicle.

13. A method of forming a badge comprising:
thermally forming an indium film into a desired shape for the badge, including thermally forming a raised symbol above a front surface on the front side of the indium film;
molding a plastic back layer to a back side of the thermally formed indium film;
molding a plastic front layer to a front side, opposite to the back side, of the thermally formed indium film; and
mounting the badge on a front of a vehicle.

14. The method of claim 13 wherein the raised symbol includes a side wherein a first section of the side is thermally formed to extend outward from the front surface at a non-perpendicular angle to the front surface and a second section of the side is thermally formed to extend outward from the first section to a top surface of the symbol essentially at a perpendicular angle to the front surface.

15. The method of claim 14 wherein the non-perpendicular angle is about twenty degrees from perpendicular to the front surface.

16. The method of claim 15 wherein the first section of the side is three to four times longer than the second section, in the direction perpendicular to the front surface.

* * * * *